United States Patent
Lin et al.

(10) Patent No.: US 7,345,266 B2
(45) Date of Patent: Mar. 18, 2008

(54) OPTICAL MEDIUM JUDGING METHOD FOR AVOIDING THE COLLISION OF AN OBJECTIVE LENS WITH A DISK

(75) Inventors: Feng Fu Lin, Taipei (TW); Kuo Chang Lin, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 115 days.

(21) Appl. No.: 10/756,281

(22) Filed: Jan. 14, 2004

(65) Prior Publication Data
US 2005/0045800 A1   Mar. 3, 2005

(30) Foreign Application Priority Data
Aug. 29, 2003   (TW) .............................. 92124048 A (51) Int. Cl.
G02B 7/04    (2006.01)
G11B 7/09    (2006.01)
G11B 7/095   (2006.01)

(52) U.S. Cl. .................. 250/201.5; 369/53.23
(58) Field of Classification Search ............. 250/201.5; 369/53.2, 53.22, 53.23
See application file for complete search history.

(56) References Cited

U.S. PATENT DOCUMENTS 5,710,749 A * 1/1998 Tsukai et al. ............ 369/53.23
6,288,988 B1 * 9/2001 Kumagai ................. 369/44.29
2002/0041542 A1 * 4/2002 Sano et al. .............. 369/44.23

FOREIGN PATENT DOCUMENTS

WO     WO 2067250 A1 *  8/2002

* cited by examiner

*Primary Examiner*—Georgia Epps
*Assistant Examiner*—Suezu Ellis
(74) *Attorney, Agent, or Firm*—Troxell Law Office, PLLC (57) ABSTRACT

The present invention relates to an optical medium judging method for avoiding the collision of an objective lens with a disk or the failure to judge a warped disk when the optical disk drive judging the disk. This method will move the objective lens so as to obtain the data of the laser beam reflection amount of the focusing beam on the plastic layer of the optical disk. By using the reflection amount, the driving circuit will output a rising direct current voltage of a voltage difference to drive an actuator so as to move the objective lens to a proper position capable of judging the disk without colliding with the disk.

6 Claims, 11 Drawing Sheets

OPTICAL MEDIUM JUDGING METHOD FOR AVOIDING THE COLLISION OF AN OBJECTIVE LENS WITH A DISK

BACKGROUND OF THE INVENTION

1. Field of the Invention

The present invention relates to an optical medium judging method, and particularly, to a method for avoiding the collision of an objective lens with a disk or the failure to judge a warped disk.

2. Description of the Prior Art

Figure 1:
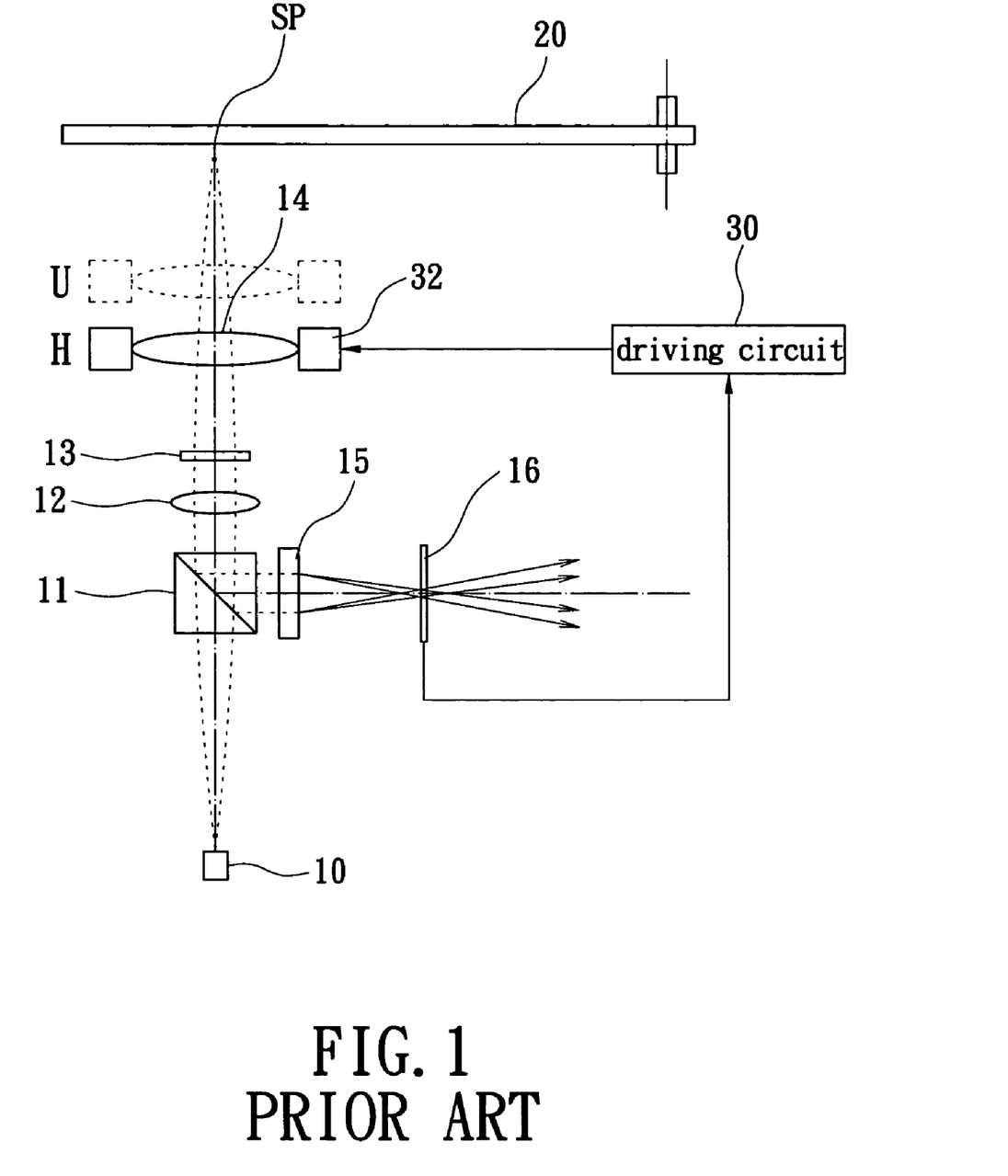
FIG. 1 is a perspective diagram of a signal reading system of an optical disk drive in the prior art.

Please refer to FIG. 1. FIG. 1 is a perspective diagram showing a pickup head and the relating devices reading a disk 20 in a prior art optical disk drive. The pickup head comprises a laser diode 10 for emitting a laser beam with a predetermined wavelength. After this beam passes through a polarization beam splitter (PBS) 11, a collimating lens 12 will converge it to be a parallel beam. This parallel beam will pass through a quarterwave plate 13, and the quarterwave plate 13 will make the linearly polarized beam to become a circularly polarized beam. The circularly polarized beam will pass through an objective lens 14, and the objective lens 14 will focus it so as to form a focusing spot SP on the disk. A driving circuit 30 will drive an actuator 32 for controlling the objective lens 14 to move forward and backward along the direction of the protracting light axis and to change the position of the focusing spot SP. Therefore, the focusing spot SP will be focused on the data layer of the disk. After the reflective light of the data layer of the disk makes the focusing spot SP reversely pass through the objective lens 14, the quarterwave plate 13, the original circular polarization will become the linear polarization, and then the pass through the collimating lens 12 so as to achieve the polarization beam splitter 11. At this time, the reflective beam is reflected to a focusing lens 15 and then received by a light detector 16 because the direction of the linear polarization is perpendicular to the original direction of the polarization.

Figure 2:
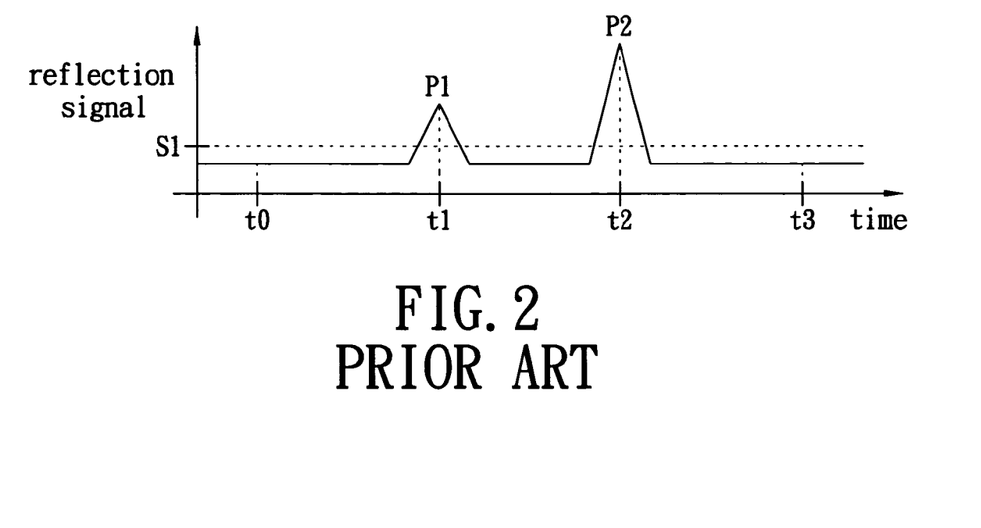
FIG. 2 is a perspective diagram of reflection amount when normally judging the disk in the prior art.

FIG. 2 is a perspective diagram of reflection amount when normally judging the disk in the prior art. The horizontal axis represents the time, while the vertical axis represents the reflection signal. At t1, a reflection signal amount peak P1 is detected, and at t2, a reflection signal amount peak P2 is detected.

Figure 3:
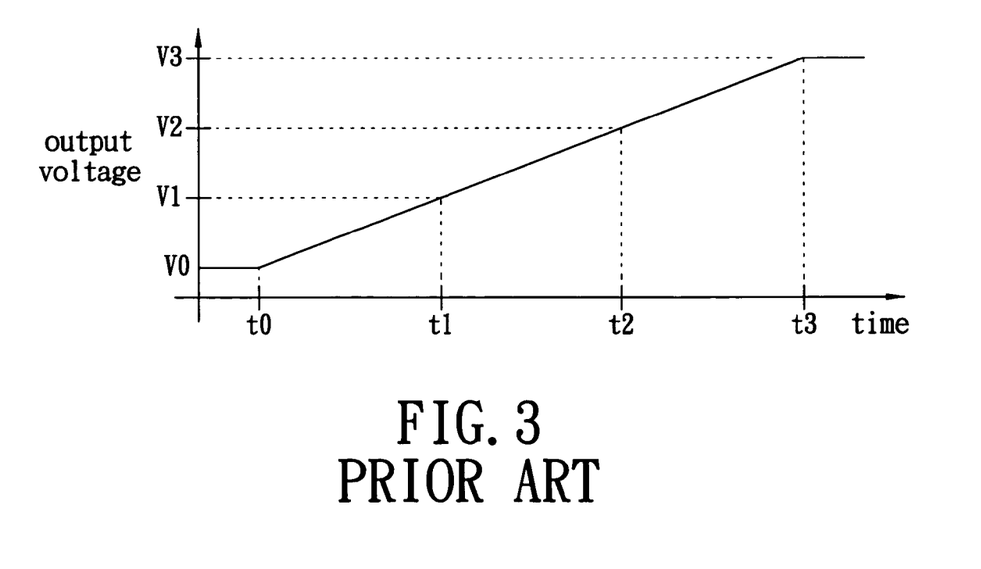
FIG. 3 is a perspective diagram of an output voltage of a driving circuit 30 when normally judging the disk in the prior art.

FIG. 3 is a perspective diagram of an output voltage of a driving circuit 30 when normally judging the disk in the prior art. The horizontal axis represents the time, while the vertical axis represents the output voltage of the driving circuit 30. At t0, the output voltage is V0, and at t1, the output voltage is V1, and at t2, the output voltage is V2, and at t3, the output voltage is V3. The unit of the time axis is corresponding to FIG. 2, the perspective diagram of the reflection amount when normally judging the disk in the prior art.

Figure 4A:
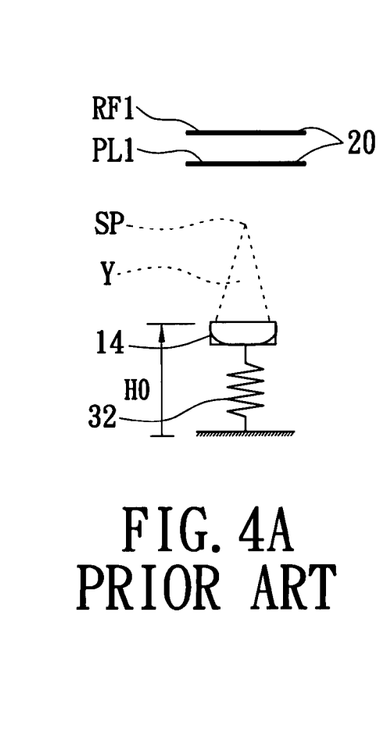
FIG. 4A~D are perspective diagrams of moving an objective lens when normally judging the disk in the prior art.

Please refer to FIG. 3. At t0, the driving circuit 30 will output the voltage V0 so as to make the objective lens 14 shown in FIG. 4A under the home position H0. At this time, the focusing spot SP is not focused on the disk 20, and therefore, in FIG. 2, the perspective diagram of the reflection amount when normally judging the disk in the prior art, at t0, the detected reflection signal amount is not greater than the predetermined value S1. Thus, the reflection signal is not obtained.

Figure 4B:
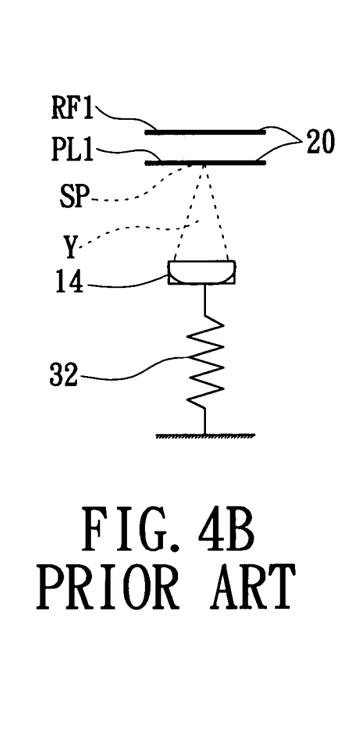

Please refer to FIG. 3 again. From t0 to t1, the output voltage of the driving circuit 30 is increased from V0 to V1 so as to make the actuator 32 in FIG. 4A move the objective lens 14 from the position of the home position H0 to the position of the objective lens 14 in FIG. 4B. At this time, the focusing spot SP is in touch with the plastic layer PL1 of the disk 20. Therefore, in FIG. 2, the perspective diagram of the reflection amount when normally judging the disk in the prior art, at t1, the detected reflection signal amount is greater than the predetermined value S1, and a first reflection peak P1 is obtained.

Figure 4C:
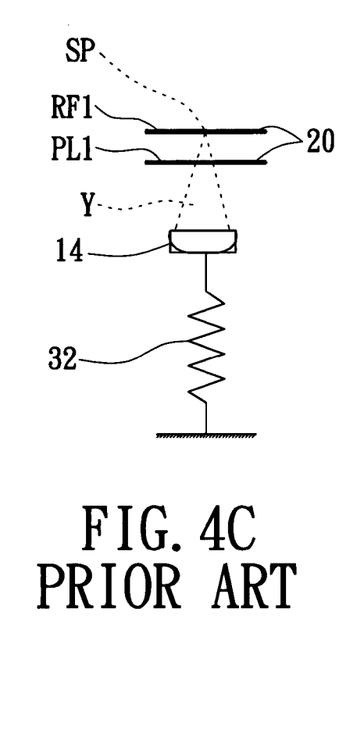

Please refer to FIG. 3 again. From t1 to t2, the output voltage of the driving circuit 30 is increased from V1 to V2 so as to make the actuator 32 in FIG. 4B move the objective lens 14 to the position of the objective lens 14 in FIG. 4C. At this time, the focusing spot SP is in touch with the reflection layer RF1 of the disk 20. Therefore, in FIG. 2, the perspective diagram of the reflection amount when normally judging the disk in the prior art, at t2, the detected reflection signal amount is greater than the predetermined value S1. Thus, a second reflection peak P2 is obtained.

Figure 4D:
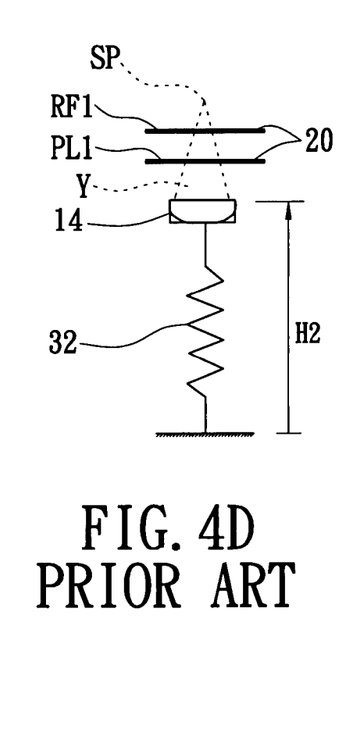

Please refer to FIG. 3 again. From t2 to t3, the output voltage of the driving circuit 30 is increased from V2 to V3 so as the make the actuator 32 in FIG. 4C move the objective lens 14 to the position of the objective lens 14 in FIG. 4D. At this time, the focusing spot SP is not focused on the disk 20, and therefore, in FIG. 2, the perspective diagram of the reflection amount when normally judging the disk in the prior art, at t3, the detected reflection signal amount is not greater than the predetermined value S1, Thus, the reflection signal is not obtained.

Furthermore, FIG. 3 shows the perspective diagram of the output voltage of the driving circuit when normally judging the disk. The operation of judging the disk is initiated at t0, and at this time, the fixed voltage outputted by the driving circuit 30 is increased from V0 to V3 so as to make the actuator 32 in FIG. 4A move the objective lens 14 from the home position H0 to the mechanical maximum H2 in FIG. 4D so that the focusing spot SP will sequentially pass through the plastic layer (PL1) and the reflection layer (RP1) of the disk 20. The distance difference of the beams Y separately reflected by the plastic layer (PL1) and the reflection layer (RF1) is measured so as to judge the type of the disk 20.

Figure 5:
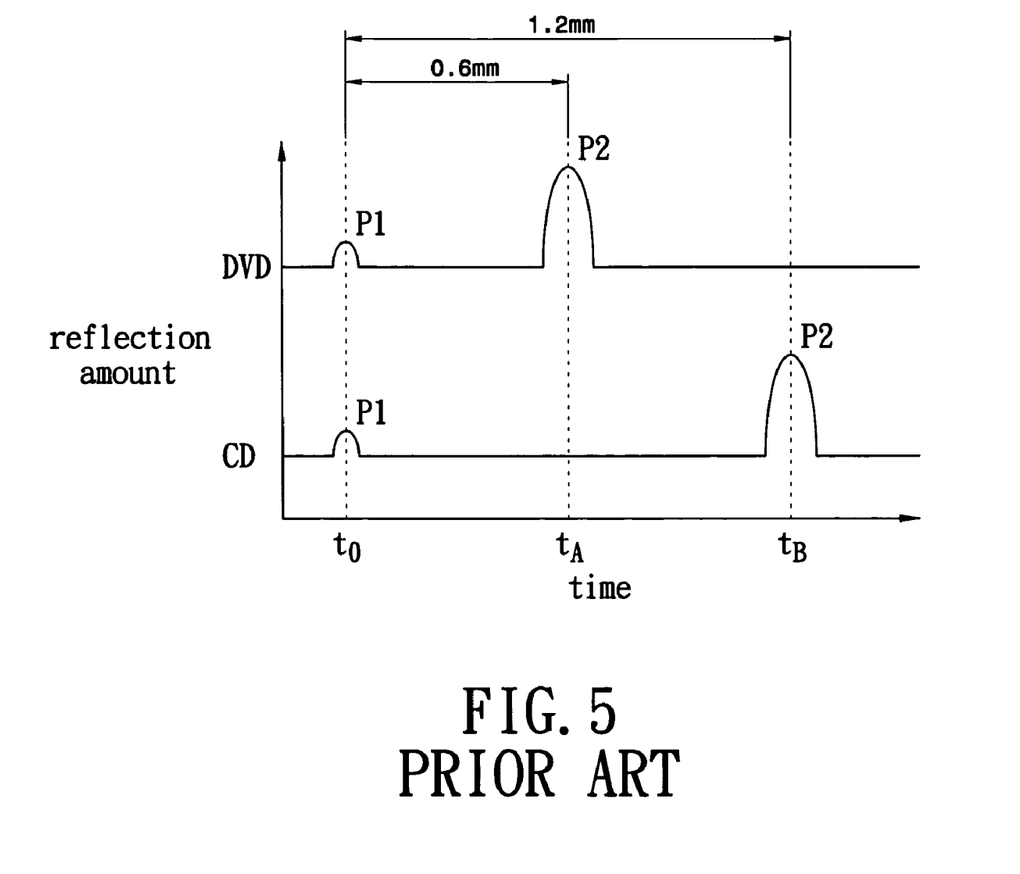
FIG. 5 is a perspective diagram of the measure result of the reflection signal of a prior art disk judging method.

To be more detailed, FIG. 5 is a perspective diagram of the measure result of the reflection signal of a prior art disk judging method. The horizontal axis represents the time, and the vertical axis separately shows the detected reflection amounts of the different types of disks (DVD, CD). As for the focusing spot, the plastic layer will generate micro reflection peak P1, and the reflection layer will generate a greater reflection peak P2. As for the DVD disk, the distance of the two peaks is 0.6 mm, and the difference of the generation times of the two peaks is tA t0. As for the CD disk, the distance of the two peaks is about 1.2 mm, and the difference of the generation times of the two peaks is tB t0. By judging the interval of the generation times of the two peaks is tA t0, the distance of the two peaks or the difference of generation times, the type of the disk is determined.

Please refer to FIG. 3 again. The fixed voltage outputted by the driving circuit 30 is increased from V0 to V3 so as to make the actuator 32 in FIG. 4 move the objective lens 14 from the home position H0 to the mechanical maximum H2 shown in FIG. 4D. However, when the disk 20 is warped, the position of the disk 20 will be higher or lower than the normal position because of the warping. When the position of the plastic layer (PL1) of the disk 20 is lower than H2 for the warping, the objective lens 14 will collide with the disk 20. When the position of the plastic layer (PL1) of the disk is exceedingly high for the warping, the focusing spot SP of the objective lens 14 cannot pass through the plastic layer (PL1) or the reflection layer (RF1) of the disk 20. Thus, the operation of judging the disk cannot be performed.

Figure 6:
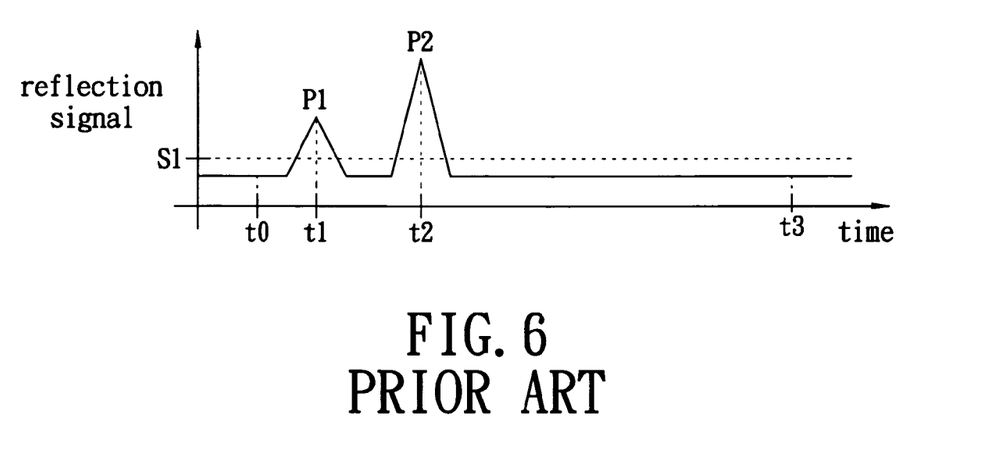
FIG. 6 is a perspective diagram of the reflection amount when the position of the disk is exceedingly low during the operation of judging the disk in the prior art.

FIG. 6 is a perspective diagram of the reflection amount when the position of the disk is exceedingly low during the operation of judging the disk in the prior art. The horizontal axis represents the time, and the vertical axis represents the reflection signal. At t1, a reflection signal amount peak P1 is detected, and at t2, a reflection signal amount peak P2 is detected.

Figure 7:
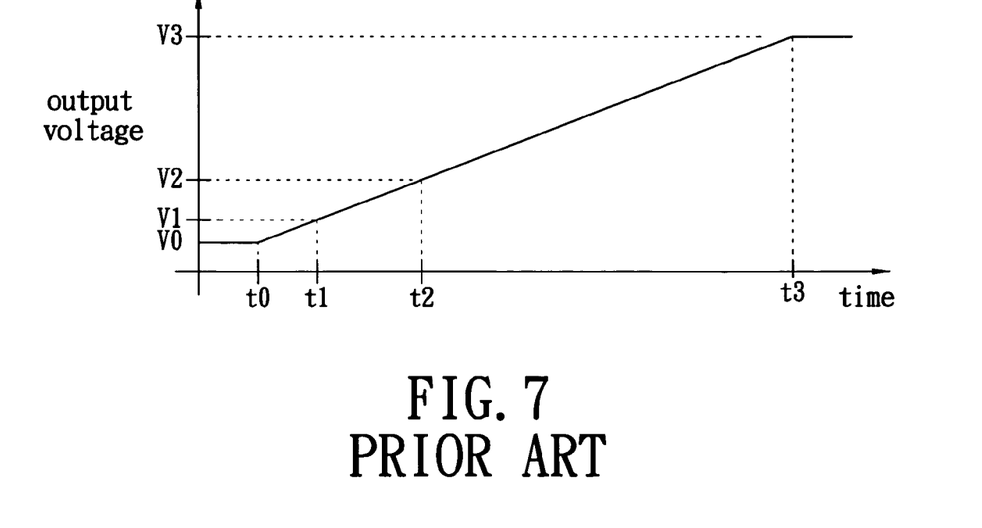
FIG. 7 is a perspective diagram of the output voltage of the driving circuit when the position of the disk is exceedingly low during the operation of judging the disk in the prior art.

FIG. 7 is a perspective diagram of the output voltage of the driving circuit when the position of the disk is exceedingly low during the operation of judging the disk in the prior art. The horizontal axis represents the time, and the vertical axis represents the output voltage of the driving circuit 30. At t0, the output voltage is V0, and at t1, the output voltage is V1, and at t2, the output voltage is V2, and at t3, the output voltage is V3. The unit of the time axis is corresponding to FIG. 6, the perspective diagram of the reflection amount when the position of the disk is exceedingly low during the operation of judging the disk in the prior art.

Figure 8A:
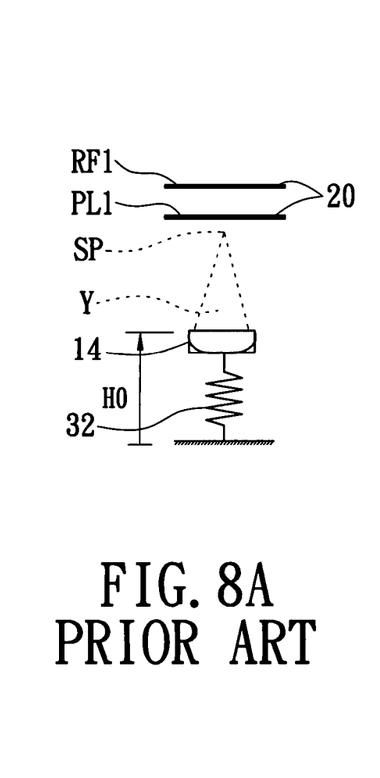
FIG. 8A~D are perspective diagrams of movement of the objective lens when the position of the disk is exceedingly low during the operation of judging the disk in the prior art.

Please refer to FIG. 7. At t0, the driving circuit 30 outputs the voltage V0 to make the objective lens 14 in FIG. 8A positioned at the home position H0. At this time, the focusing spot SP is not focused on the disk 20. In FIG. 6, the perspective diagram of the reflection amount when the position of the disk is exceedingly low during the operation of judging the disk in the prior art, the detected reflection signal amount is not greater than the predetermined value S1 at t0. Therefore, the reflection signal is not obtained.

Figure 8B:
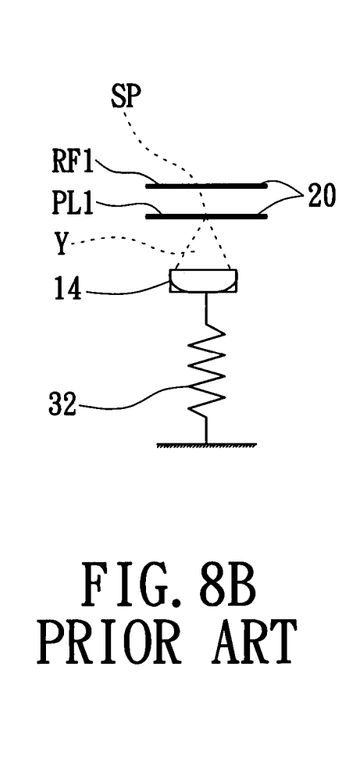

Please refer to FIG. 7. From t0 to t1, the output voltage of the driving circuit 30 is increased from V0 to V1 so as to make the actuator 32 in FIG. 8A move the objective lens 14 from the position of the home position H0 to the position of the objective lens 14 in FIG. 8B. At this time, the focusing spot SP is in touch with the plastic layer PL1 of the disk 20. Therefore, in FIG. 6, the perspective diagram of the reflection amount when the position of the disk is exceedingly low during the operation of judging the disk in the prior art, the detected reflection signal amount is greater than the predetermined value S1 at t1, and the first reflection peak P1 is obtained.

Figure 8C:
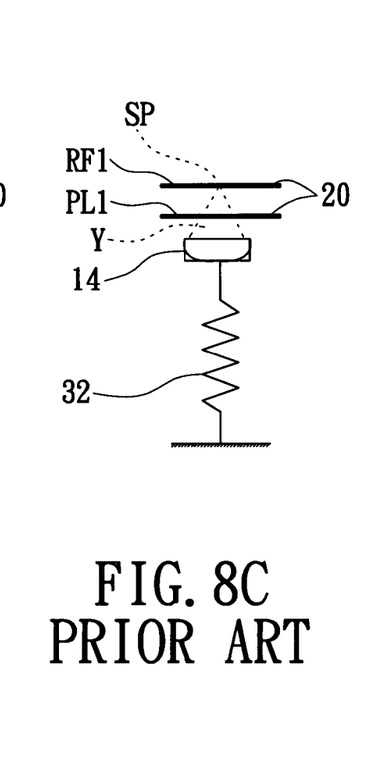

Please refer to FIG. 7 again. From t1 to t2, the output voltage of the driving circuit 30 is increased from V1 to V2 so as to make the actuator 32 in FIG. 8B move the objective lens 14 to the position of the objective lens 14 in FIG. 8C. At this time, the focusing spot SP is in touch with the reflection layer RF1 of the disk 20. Therefore, in FIG. 6, the perspective diagram of the reflection amount when the position of the disk is exceedingly low during the operation of judging the disk in the prior art, the detected reflection signal amount at t2 is greater than the predetermined value S1, and the second reflection peak P2 is obtained.

Figure 8D:
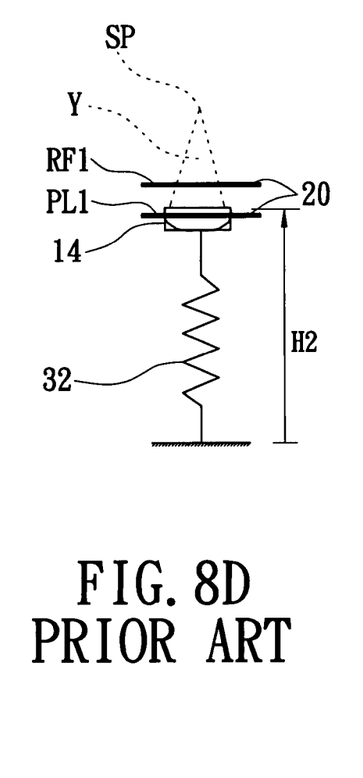

Please refer to FIG. 7. From t2 to t3, the output voltage of the driving circuit 30 is increased from V2 to V3 so as to make the actuator 32 in FIG. 8C move the objective lens 14 to the position of mechanical maximum H2 shown in FIG. 8D. At this time, because the position of the disk 20 is exceedingly low, the objective lens 14 will collide with the disk 20 when it moves to H2, and the focusing spot SP is not focused on the disk 20. Therefore, in FIG. 6, the perspective diagram of the reflection amount when the position of the disk is exceedingly low during the operation of judging the disk in the prior art, the detected reflection signal amount at t3 is not greater than the predetermined value S1. Thus, the reflection signal is not obtained.

Figure 9:
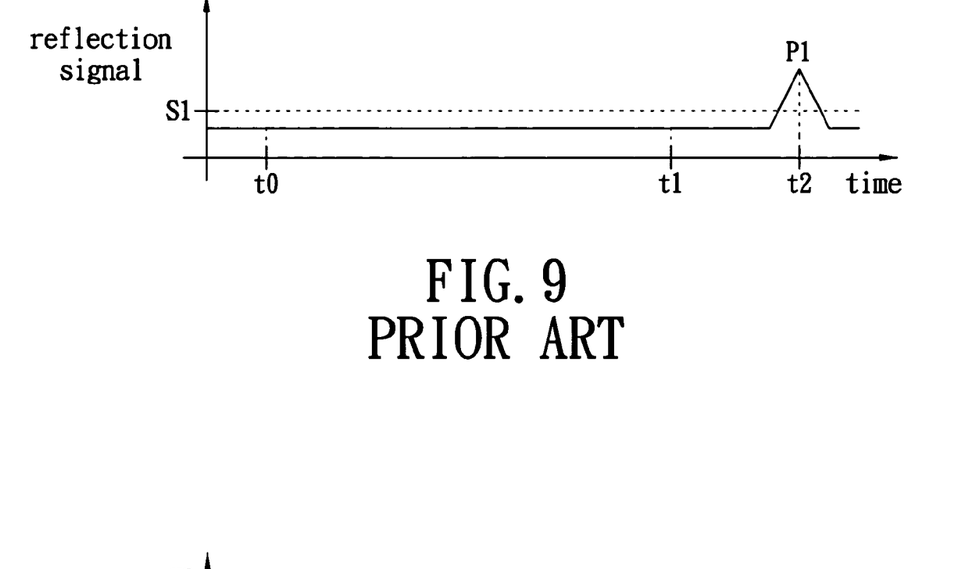
FIG. 9 is a perspective diagram of the reflection amount when the position of the disk is exceedingly high during the operation of judging the disk in the prior art.

FIG. 9 is a perspective diagram of the reflection amount when the position of the disk is exceedingly high during the operation of judging the disk in the prior art. The horizontal axis represents the time, and the vertical axis represents the reflection signal. At t2, a reflection signal amount peak P1 is detected.

Figure 10:
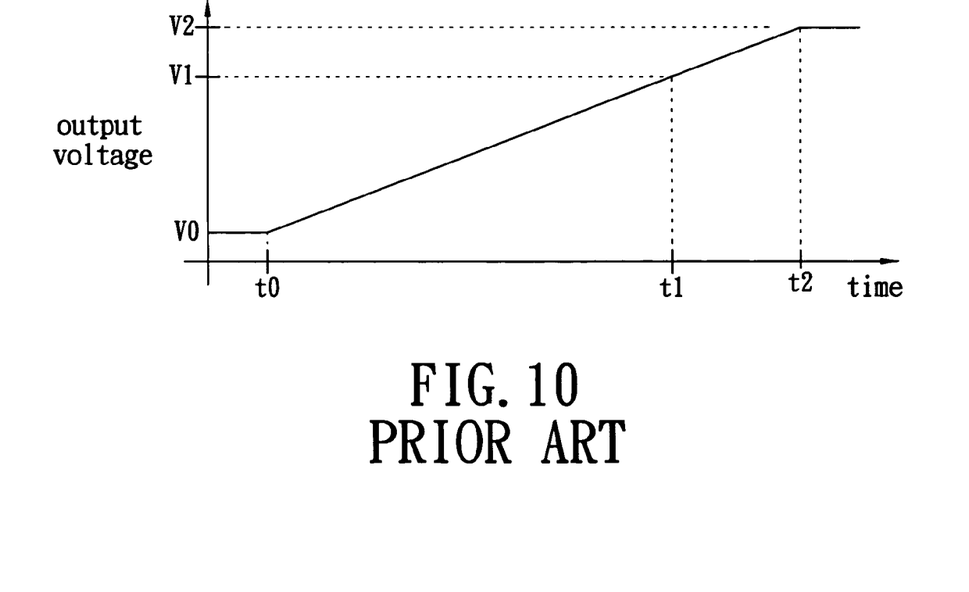
FIG. 10 is a perspective diagram of the output voltage of the driving circuit when the position of the disk is exceedingly high during the operation of judging the disk in the prior art.

FIG. 10 is a perspective diagram of the output voltage of the driving circuit when the position of the disk is exceedingly high during the operation of judging the disk in the prior art. The horizontal axis represents the time, and the vertical axis represents the output voltage of the driving circuit 30. At t0, the output voltage is V0, and at t1, the output voltage is V1, and at t2, the output voltage is V2. The unit of the time axis is corresponding to FIG. 9, the perspective diagram of the reflection amount when the position of the disk is exceedingly high during the operation of judging the disk in the prior art.

Figure 11A:
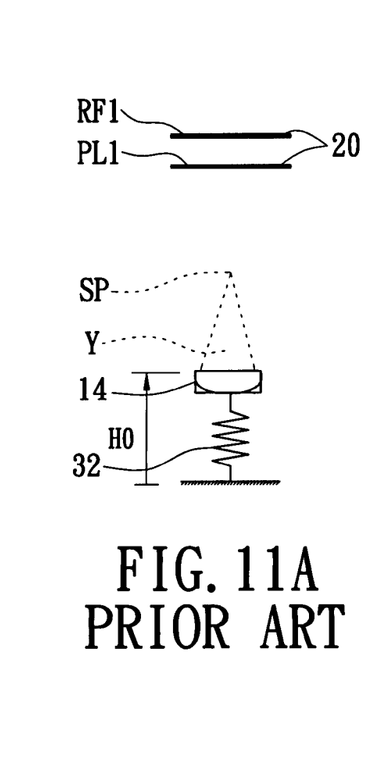
FIG. 11A~D are perspective diagrams of movement of the objective lens when the position of the disk is exceedingly high during the operation of judging the disk in the prior art.

Please refer to FIG. 10. At t0, the driving circuit 30 outputs the voltage V0 so as to make the objective lens 14 shown in FIG. 11A positioned at the home position H0. At this time, the focusing spot SP is not focused on the disk 20. Therefore, in FIG. 9, the perspective diagram of the reflection amount when the position of the disk is exceedingly high during the operation of judging the disk in the prior art, the detected reflection signal amount at t0 is not greater than the predetermined value S1. Thus, the reflection signal is not obtained.

Figure 11B:
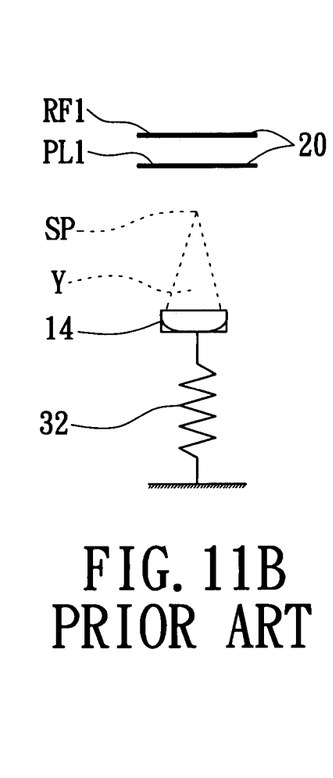
Figure 11C:
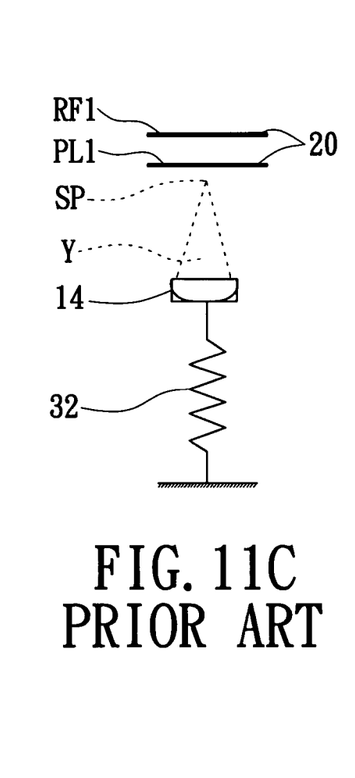

Please refer to FIG. 10 again. From t0 to t1, the output voltage of the driving circuit 30 is increased from V0 to V1 so as to make the actuator 32 shown in FIG. 11A move the objective lens 14 from the position of the home position H0 to the position of the objective lens 14 shown in FIG. 11B, and finally to the position of the objective lens 14 shown in FIG. 11C. At this time, the focusing spot SP is not in touch with the plastic layer PL1 of the disk 20. Therefore, in FIG. 9, the perspective diagram of the reflection amount when the position of the disk is exceedingly high during the operation of judging the disk in the prior art, the reflection signal amount detected at t1 is also smaller than the predetermined value S1. Thus, the reflection signal is not obtained.

Please refer to FIG. 10 again. From t1 to t2, the output voltage of the driving circuit 30 is increased from V1 to V2 so as to make the actuator 32 in FIG. 11C move the objective lens 14 to the position of the mechanical maximum H2 shown in FIG. 11D. At this time, the focusing spot SP is in touch with the plastic layer PL1 of the disk 20. Therefore, in FIG. 9, the perspective diagram of the reflection amount when the position of the disk is exceedingly high during the operation of judging the disk in the prior art, the reflection signal amount detected at t2 is greater than the predetermined value S1. Thus, a reflection peak P1 is obtained.

Figure 11D:
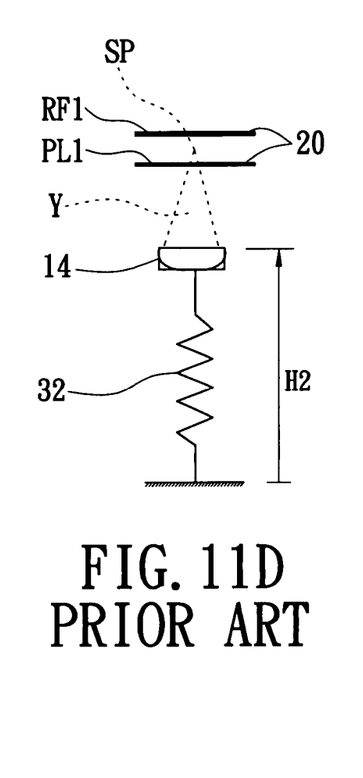

Please refer to FIG. 11D. Because the position of the disk 20 is exceedingly high, the focusing spot SP on the measure beam Y only can be in touch with the plastic layer PL1 of the disk 20, but cannot pass through the reflection layer RF 1 when the objective lens 14 moves to the mechanical maximum H2. Therefore, in FIG. 9, the perspective diagram of the reflection amount when the position of the disk is exceedingly high during the operation of judging the disk in the prior art, only a reflection peak P1 is generated. This causes the type of the disk 20 cannot be judged.

SUMMARY OF THE INVENTION

Therefore, the object of the present invention is to provide an optical medium judging method capable of effectively avoiding the collision of an objective lens with a disk or the failure to judge a warped disk when the optical disk drive is judging the disk.

Accordingly, the present invention provides an optical medium judging method. In this method, when the focusing spot SP passes through the plastic layer (PLI) of the disk 20, the reflection amount is measured. Based on that reflection amount, the light detector 16 makes the driving circuit 20 output a proper direct current rising voltage difference $\Delta V$ for driving the actuator 32 to make the objective lens 14 move a relative distance $\Delta H$ proportional to $\Delta V$. Therefore, the objective lens 14 will move to a proper position where the objective lens 14 can judge the disk and will not be in touch with the disk 20.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENT

Figure 15:
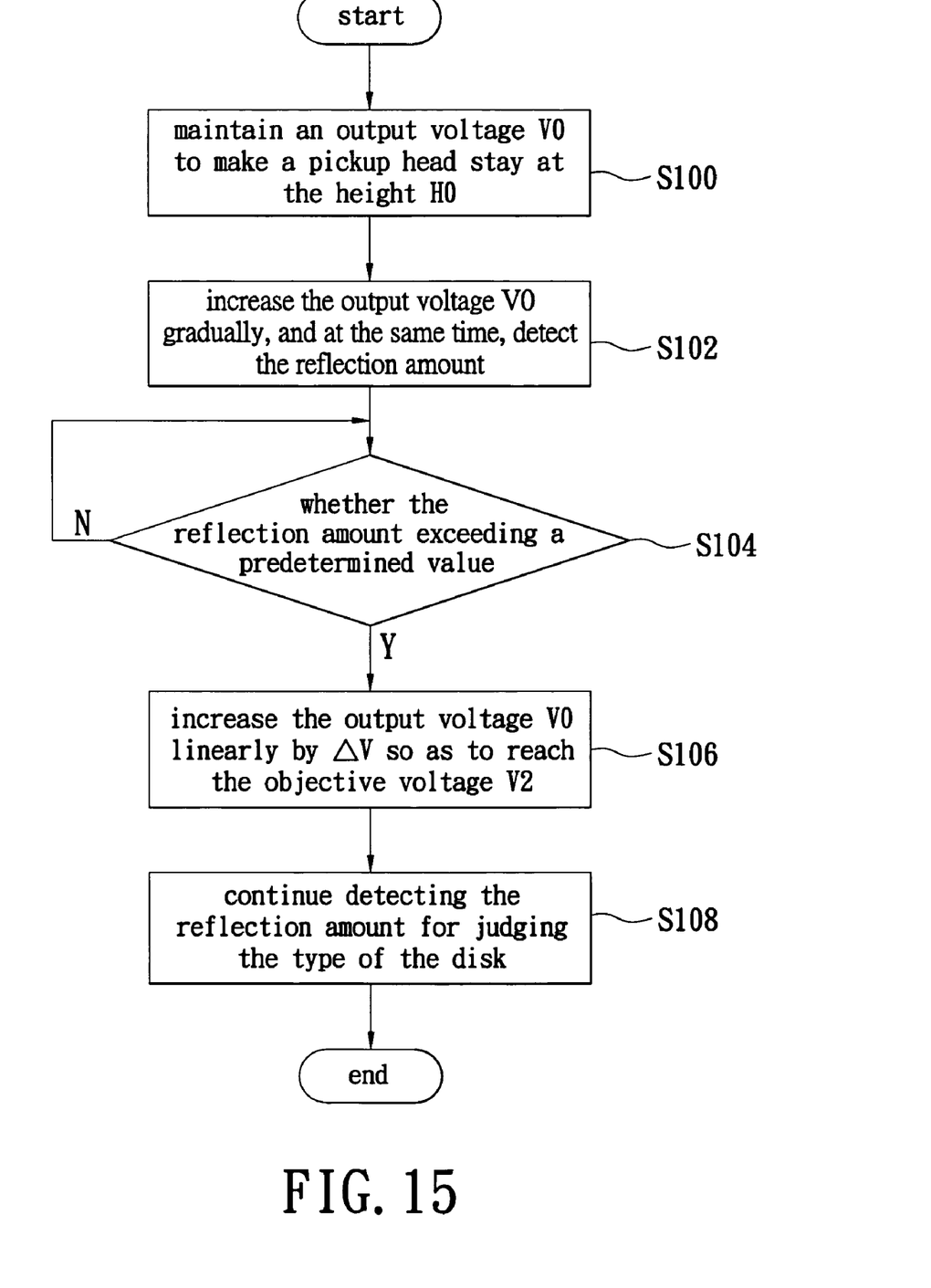
FIG. 15 is a flowchart of the present invention.

The present invention relate to an optical medium judging method capable of effectively avoiding the collision of the objective lens 14 with the disk 20 or the failure to judge a warped disk when the optical disk drive is judging the disk. The present invention can be applied in a signal reading system of an optical disk drive shown in FIG. 1. Therefore, the present invention is described by referring to FIG. 1. The flowchart of the present invention is as follows:

Outputting a direct current voltage V0 by a driving circuit to make an objective lens stay at the position with height H0, a home position (S100);

Increasing the output voltage gradually by the driving circuit, and at the same time, the light detector detecting the reflection amount (Sl02);

Detecting whether the reflection amount exceeding a predetermined value by a light detector (Sl04);

Increasing a predetermined voltage difference $\Delta V$ by the driving circuit when the reflection amount exceeding a predetermined value so as to make the output voltage reach the objective voltage (S106); and Continuing detecting the reflection amount of the laser beam by the light detector for judging the type of the disk (S108).

Figure 12:
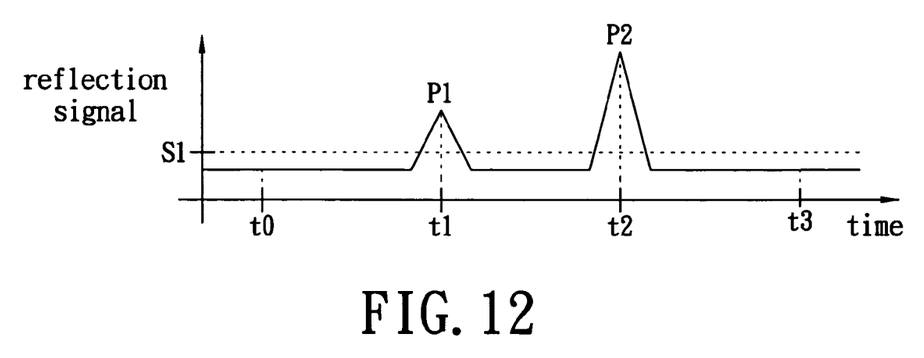
FIG. 12 is a perspective diagram of the reflection amount when judging the disk according to the present invention.

FIG. 12 is a perspective diagram of the reflection amount when judging the disk according to the present invention. The horizontal axis represents the time, and the vertical axis represents the reflection signal. At t1 a reflection signal amount peak P1 is detected, and at t2, a reflection signal amount peak P2 is detected.

Figure 13:
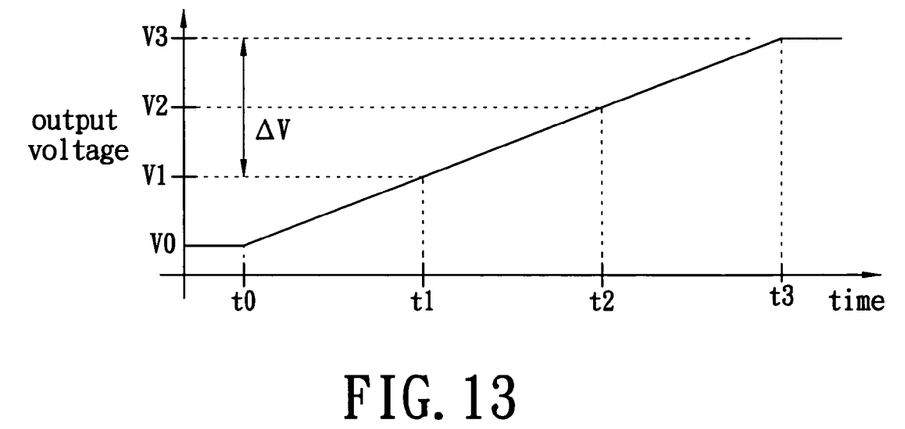
FIG. 13 is a perspective diagram of the output voltage of the driving circuit when judging the disk according to the present invention.

FIG. 13 is a perspective diagram of the output voltage of the driving circuit when judging the disk according to the present invention. The horizontal axis represents the time, and the vertical axis represents the output voltage of the driving circuit 30. At t0, the output voltage is V0, and at t1, the output voltage is V1, and at t2, the output voltage is V2, and at t3, the output voltage is V3, and $\Delta V$ is the voltage difference between V1 and V3. Furthermore, the unit of the time axis is corresponding to FIG. 12, the perspective diagram of the reflection amount when judging the disk according to the present invention.

Figure 14A:
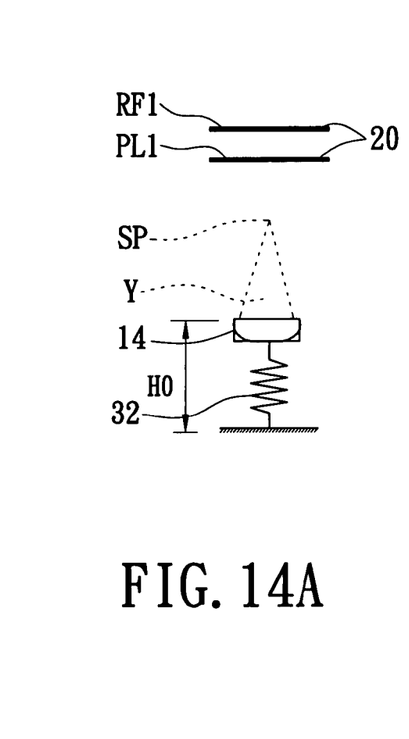
FIG. 14A~D are perspective diagrams of movement of the objective lens when judging the disk according to the present invention.

Please refer to FIG. 13. At t0, the driving circuit 20 outputs the voltage V0 to make the objective lens 14 shown in FIG. 14A positioned at the home position H0. At this time, the focusing spot SP is not focused on the disk 20. Therefore, in FIG. 12, the perspective diagram of the reflection amount when judging the disk according to the present invention, the reflection signal amount detected at t0 is not greater than the predetermined value S1. Thus, the reflection signal is not obtained.

Figure 14B:
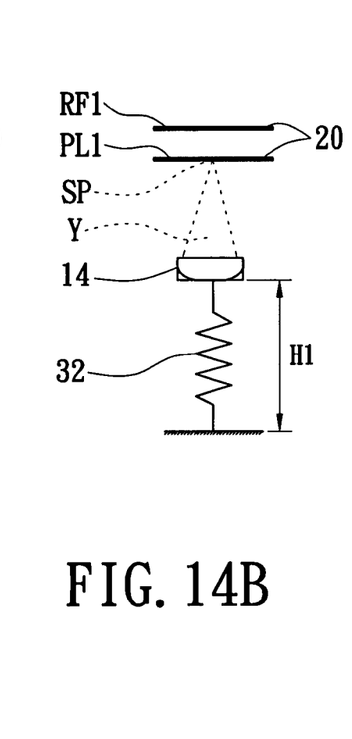

Please refer to FIG. 13 again. From t0 to t1, the output voltage of the driving circuit 30 is increased from V0 to V1, making the actuator 32 shown in FIG. 14A move the objective lens 14 from the position of the home position H0 to the position H1 of the objective lens 14 shown in FIG. 14B. At this time, the focusing spot SP is in touch with the plastic layer PL1 of the disk 20. Therefore, in FIG. 12, the perspective diagram of the reflection amount when judging the disk according to the present invention, the reflection signal amount detected at t1 is greater than the predetermined value S1. Thus, a first reflection peak P1 is obtained.

Figure 14C:
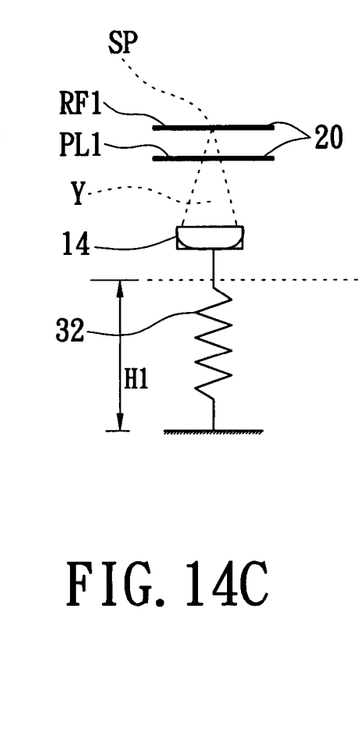

Please refer to FIG. 13 again. After the light detector 16 obtains the first reflection peak P1, the output voltage of the driving circuit 30 is increased by a predetermined voltage difference $\Delta V$, and increased from V1 to V2, and to the objective voltage V3 so as to drive the actuator 32 in FIG. 14B to make the objective lens 14 positioned at H1 move to the position of the objective lens 14 shown in FIG. 14C, and finally to the position H2 of the objective lens 14 shown in FIG. 14D. The mentioned predetermined voltage difference ΔV is proportional to the relative distance ΔH between H1 and H2. At this time, the light detector 16 will continuously detect the reflection signal. At t2, the output voltage of the driving circuit 30 is V2, and as shown in FIG. 14C, the focusing spot SP is in touch with the reflection layer RF1 of the disk 20. Therefore, in FIG. 12, the perspective diagram of the reflection amount when judging the disk according to the present invention, the reflection signal amount detected at t2 is greater than the predetermined value S1. Thus, the second reflection peak P2 is obtained. At this time, the light detector 16 detects the second reflection peak P2 for judging the type of the disk.

Figure 14D:
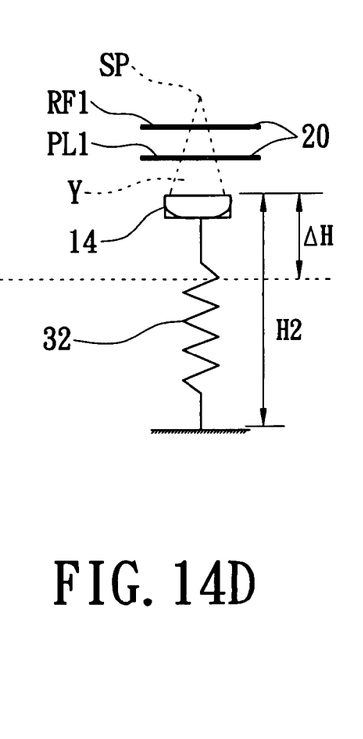

The predetermined voltage difference ΔV in FIG. 13 is required to be so great that the objective lens 14 in FIG. 14D can move to make the focusing spot SP pass through the reflection layer (RF1). However, the predetermined voltage difference ΔV cannot be exceedingly great, or the objective lens 14 will collide with the disk 20. Finally, the objective lens 14 can stay a proper position with a proper distance from the disk 20.

The predetermined voltage difference ΔV can be obtained by using the follows:

It is known that under an ideal status, the height of the objective lens 14 is proportional to the output voltage of the driving circuit 30:

$$H = K \times V \quad (1)$$

Therefore, under the voltages V1 and V2, the heights of the objective lens 14 are:

$$H1 = K \times V1 \quad (2)$$

$$H2 = K \times V2 \quad (3)$$

Thus, $$\Delta V = V2 - V1 = (H2 - H1)/K = \Delta H/K \quad (4)$$

The symbols in the above formulas (1), (2), (3), (4) represent the follows: K is a coefficient, H is the height of the objective lens 14, and V is the output voltage of the driving circuit 30.

Please refer to FIG. 14D. Here, ΔH has to be greater than the thickness of the disk, and therefore, the focusing spot SP can pass through all of the reflection layers (RF1). Besides, ΔH has to be smaller than the lengths of the objective lens 14 and the focusing spot SP, namely, the distance between the objective lens 14 and the disk 20 when the light detector 16 detecting a reflection signal greater than the predetermined value, so as to ensure that the objective lens 14 will not collide with the disk 20.

In summary, the optical medium judging method according to the present invention can effectively avoid the collision of the objective lens 14 with the disk 20 or the failure to judge a warped disk, making the position of the disk too low or too high, when the optical disk drive judging the disk. Therefore, the usage life spans of the objective lens 14 and the disk 20 can be increased, and the probability of the correct disk judging can be promoted.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical medium judging method comprising:
    positioning an optical focusing unit at a first position, wherein the optical focusing unit comprises an objective lens and an actuator, and the objective lens focuses a laser beam;
    driving the actuator to move the objective lens to an optical disk by a driving circuit so as to make the laser beam focus a spot on the optical disk;
    detecting a reflection value by a reading unit;
    exerting a predetermined voltage difference to the actuator by the driving circuit so as to make the objective lens move a distance relative to the predetermined voltage difference when the reflection value is greater than a predetermined value, wherein the distance is greater than a thickness of the optical disk and smaller than a distance between the objective lens and the optical disk; and
    continuing to detect the reflection value to judge the type of the disk, wherein the optical focusing unit is located to avoid the lens colliding with the optical disk.

2. The optical medium judging method of claim 1, wherein the first position is a home position.

3. The optical medium judging method of claim 1, wherein the reading unit is a light detector.

4. The optical medium judging method of claim 1, wherein the predetermined voltage difference is proportional to the fixed distance.

5. The optical medium judging method of claim 1, wherein the reflection value is the reflection amount of the laser beam projected on the optical disk.

6. The optical medium judging method of claim 1, wherein the predetermined value is equal to a value of a reflection amount of the laser beam projected on a plastic layer of the optical disk.

* * * * *